Oct. 29, 1968  E. A. KELLER  3,408,649
RANGE AND BEARING MEASUREMENT SYSTEM
Filed Jan. 30, 1967  3 Sheets-Sheet 1
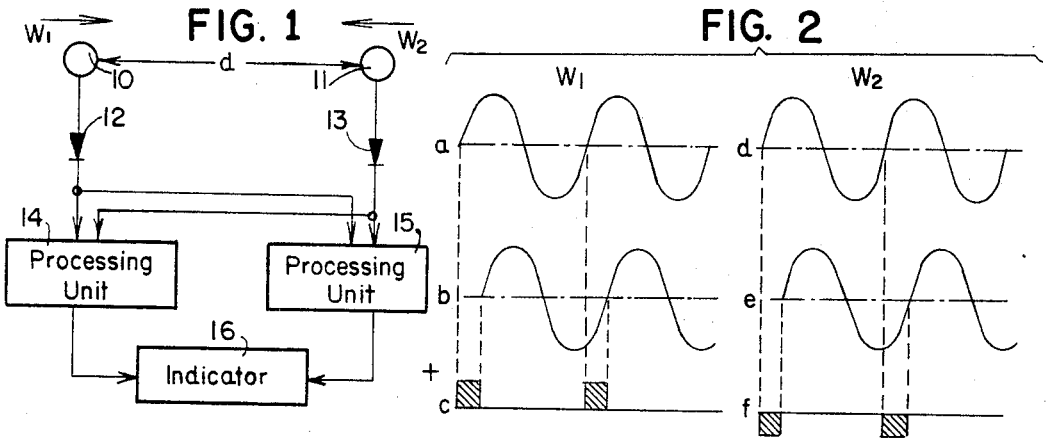
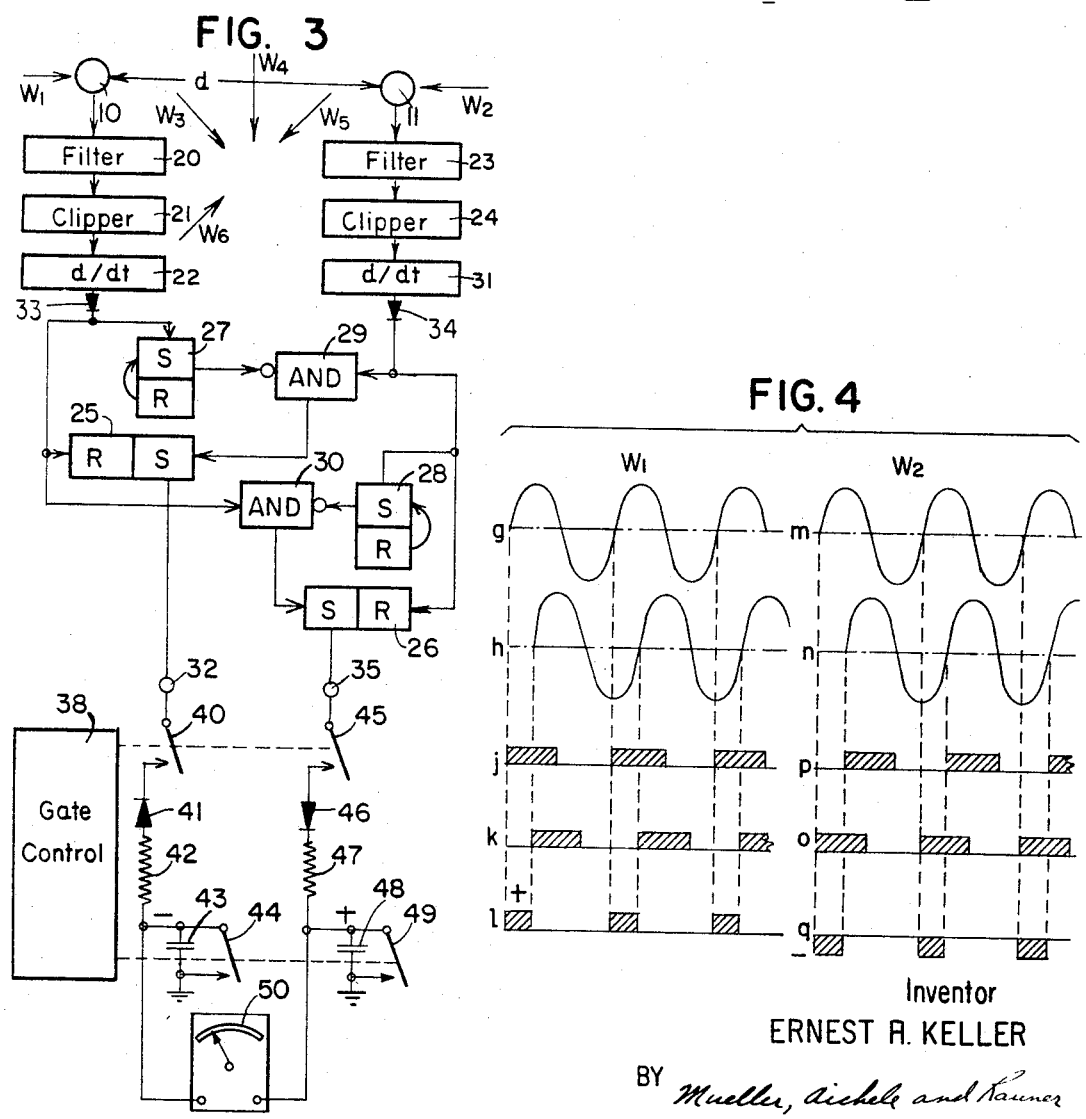
Inventor
ERNEST A. KELLER
BY Mueller, Aichele and Launer
ATTYS.

Inventor
ERNEST A. KELLER
BY Mueller, Aichele and Ramner
ATTYS.

Oct. 29, 1968  E. A. KELLER  3,408,649
RANGE AND BEARING MEASUREMENT SYSTEM
Filed Jan. 30, 1967  3 Sheets-Sheet 3
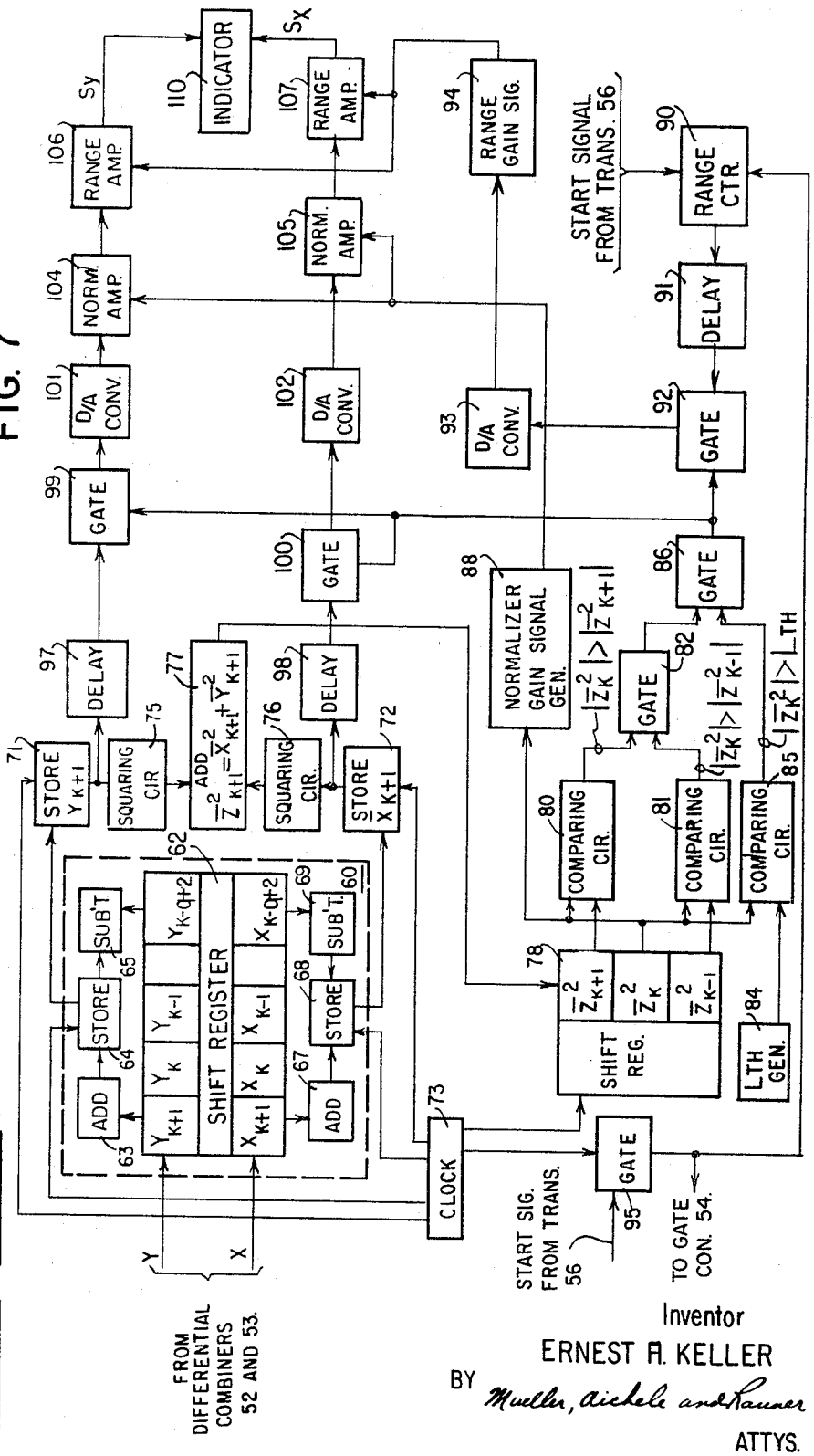
Inventor
ERNEST A. KELLER
BY Mueller, Aichele and Hauser
ATTYS.

United States Patent Office 3,408,649
Patented Oct. 29, 1968

3,408,649
RANGE AND BEARING MEASUREMENT SYSTEM
Ernest A. Keller, Wilmette, Ill., assignor to Motorola, Inc., Franklin Park, Ill., a corporation of Illinois
Filed Jan. 30, 1967, Ser. No. 612,601
11 Claims. (Cl. 343—13)

ABSTRACT OF THE DISCLOSURE

A range and bearing measurement system using persistency of bearing as a range measurement criterion. Bearing signals are derived by processing the received signals to determine the direction from which the received signal is coming. By further processing of the bearing signals, the sum of the squares of the bearing signals forms a merit signal. When the merit signal is greater than an arbitrary threshold signal and a local maximum, the arrival of the return echo is indicated.

Cross references

The system is useful with statistical information detection systems such as are described in the application of Ernest A. Keller, Ser. No. 436,735, filed Mar. 3, 1965, refiled as a continuation-in-part application Feb. 21, 1967, Ser. No. 633,641, now U.S. Patent No. 3,383,690 and Donald O. Rail, Ser. No. 441,104, filed Mar. 19, 1965, now Patent No. 3,339,204.

Summary

It is, therefore, an object of this invention to provide an improved range measuring system.

Another object of this invention is to provide a range measuring system operable in environment where the desired signal is less than the noise level.

Another object of this invention is to provide a range measuring system using the confidence of bearing information accuracy as a measure of the time of return of a desired signal.

In practicing this invention a transmitter is provided which periodically transmits waves having a predetermined pulse length. The wave pulses are reflected from the object, the range to which is to be measured. Receiving means are provided, including a plurality of transducers, which are responsive to the returning waves reflected from the object. Signal processing means develop a plurality of first and second bearing signals designated as X and Y in response to the waves received by the transducer. The bearing signals are integrated to develop new bearing signals $\overline{X}$ and $\overline{Y}$. The integrated bearing signals $\overline{X}$ and $\overline{Y}$ are squared and added to form a merit signal, $\overline{Z}^2 = \overline{X}^2 + \overline{Y}^2$. A threshold signal having an arbitrary magnitude is generated and compared with the received merit signals. Each merit signal is also compared with the merit signal preceding and following it. The comparing means is responsive to a merit signal greater than the threshold signal and which also is a local maximum, that is, greater than the preceding and following merit signals, to develop a range signal which indicates that a return echo has been received. Timing means are provided for determining the time interval between the transmitted wave and the generation of the range signal. This time interval is an indication of the range to the object.

The invention is illustrated in the drawings of which:

FIG. 1 is a simplified block diagram of the bearing determination portion of the system;

FIG. 2 is a set of curves illustrating the operation of the system of FIG. 1;

FIG. 3 is a partial block diagram and partial schematic of the bearing determination portion of the system shown in more detail;

FIG. 4 is a set of curves illustrating the operation of the system of FIG. 3;

FIG. 6 is a block diagram showing the relationship between the range and bearing determination portions of the system; and FIG. 7 is a block diagram of the range determination portion of the system.

Description

Figure 5:
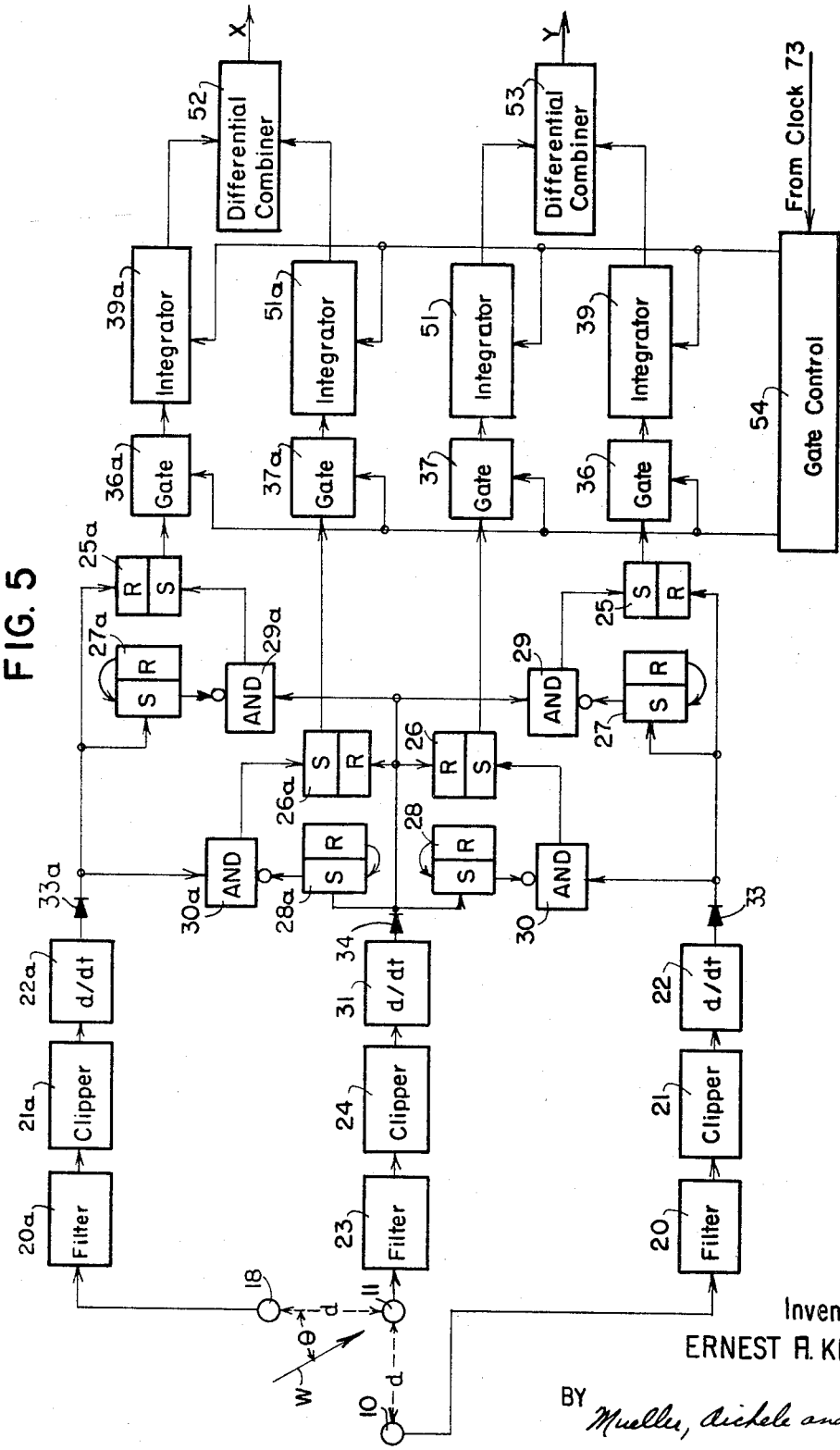
FIG. 5 is a block diagram of the bearing determination portion of the system wherein an unambiguous bearing is obtained.

Referring to the drawings in FIG. 1 there is shown a system including transducers 10 and 11. Transducers 10 and 11 may be units of various types depending upon the type of wave to be detected. Transducers 10 and 11 respond to level changes of a physical quantity to develop an electrical signal. Waves from transducer 10 are provided through rectifier 12 to the two processing units 14 and 15. Transducer 11 is spaced from transducer 10 by a distance $d$ less than one-half wave length at the highest frequency to be received and in considering the operation of FIG. 1 higher frequency waves are not present. The waves from transducer 11 are applied through rectifier 12 to processing units 14 and 15. The outputs from the processing units 14 and 15 are applied to indicating device 16.

The operation of the system of FIG. 1 will be explained in connection with waves as illustrated in FIG. 2. Considering wave $W_1$, which is passing in the direction from transducer 10 to transducer 11, curve $a$ in FIG. 2 shows the arrival of the wave at transducer 10. The wave, $W_1$, will arrive at transducer 11 at a later time as shown by curve $b$. The processing unit 14 recognizes that activation of transducer 10 preceded the activation of transducer 11. This "10 before 11" response produces in the processing circuitry, a wave of positive pulses as shown by a curve $c$. Each pulse starts when the wave $W_1$ at transducer 10 has a positive-going zero crossing and terminates when the wave $W_1$ at transducer 11 has a positive-going zero crossing. The duration of this pulse, therefore, indicates the length of time required for wave $W_1$ to pass from transducer 10 to transducer 11.

The wave $W_2$ represents a wave passing in the direction from transducer 11 to transducer 10. Line $d$ FIG. 2 shows the wave $W_2$ as it arrives at transducer 11. The unit 15 will be actuated by the positive-going zero crossings of the wave $W_2$ at transducer 11 and cut off by the positive-going zero crossings of the wave $W_2$ at transducer 10 (curve $e$). In this case, transducer 11 is activated before transducer 10 and the processing unit 15 produces for this case of "11 before 10" a negative-going waveform (curve $f$).

It will be apparent that when waves $W_1$ and $W_2$ come from exactly opposite directions, the pulse outputs of processing units 14 and 15 will be exactly the same but with opposite polarities. These pulse outputs are combined within indicator 16 so that there is no output. However, if the wave $W_1$ is a signal from the direction shown and there is no corresponding wave from the opposite direction, the output of unit 14 would be applied to the indicator 16. Accordingly, the device 16 will give an indication of the wave $W_1$ (positive). Similarly only the unit 15 will produce an output if the wave $W_2$ is received alone and there is no corresponding output from the unit 14. The indicator 16 can obviously indicate which of the units 14 and 15 produces the greater output and thereby give an indication of the direction of the signal.

FIG. 3 shows more specifically the processing arrangement which can be used in the system as illustrated in FIG. 1. The transducers 10 and 11 are spaced by a distance $d$ less than $L/2$ where L is the wavelength at the highest frequency to be utilized. The signal from transducer 10 is applied through a filter 20 to a clipper 21. The filter 20 must have an upper cutoff frequency less than $C/L$ where C is the velocity of wave propagation. Filter 20 may be a low pass filter, but a bandpass filter may be preferable in some applications so that noise at low frequencies, which are not to be considered, will be rejected. If a signal is to be detected in an environment where noise is not of consequence, a filter is not required, as long as the $C/L$ frequency limit is not exceeded. The output of filter 20 is applied to clipper 21 which may be any known clipper circuit. The purpose of the clipper is to provide a square wave having sharp zero crossings. The output of clipper 21 is applied to differentiating circuit 22 which differentiates the pulses from clipper 21 to produce sharp pulses at the leading and trailing edges of the pulses. Diode 33 clips the pulses resulting from the trailing edges of the square wave so that the output pulses from diode 33 represent the leading edges of the square wave output from clipper 21 or the positive-going zero crossings.

The signals from transducer 11 are applied to filter 23, clipper 24, differentiator 31 and diode 34, which may be identical to filter 20, clipper 21, differentiator 22 and diode 33. The signals at the output of diodes 33 and 34 are applied to a processing circuit which includes bistable multivibrator circuits 25 and 26, monostable multivibrator circuits 27 and 28, and AND gates 29 and 30. The positive signal from differentiator 22 is applied directly to the reset stage of bistable multivibrator circuit 25, and the positive signal from differentiator 31 is applied through AND gate 29 to the set stage of bistable multivibrator circuit 25. The positive-going signal from differentiator 22 is also applied to monostable circuit 27 to trigger the same for a given time period. This period may be more than one-half the period of the highest frequency wave to be received and less than the complete period of this wave. The monostable circuit 27 provides an inhibit signal to AND gate 29 thus preventing any positive trigger pulse from differentiator 31 reaching bistable circuit 25 during the activation time of monostable circuit 27.

The operation of the circuit of FIG. 3 will be described in connection with the waves $W_1$ and $W_2$ which approach the transducers from opposite directions, the waveforms of which are shown in FIG. 4. Wave $W_1$ reaches transducer 10 before it reaches transducer 11, with curve $g$ in FIG. 4 showing the wave $W_1$ of transducer 10 and curve $h$ showing the wave $W_1$ at transducer 11. Wave $W_1$ produces a signal at transducer 10 and the resulting pulse, the output of differentiator 22, triggers the monostable circuit 27 to inhibit AND gate 29. The monostable circuit is triggered for a period equal to one-half the wavelength of $W_1$, as is shown by the pulse wave $j$. Accordingly, the signal from transducer 11 and the pulse produced therefrom by differentiator 31 cannot be applied to set the bistable circuit 25 because AND gate 29 is inhibited. Therefore, bistable circuit 25 cannot be set and does not produce an output at terminal 32.

The pulse at the output of differentiator 22, produced by the waves $W_1$ at transducer 10, is also applied through AND gate 30 to bistable 26. As AND gate 30 is not inhibited, a trigger pulse passes through to set bistable circuit 26 so that an output appears at terminal 35. The output of differentiator 31 from wave $W_1$ applied to transducer 11 is also applied to monostable circuit 28 and inhibits AND gate 30 for the time shown on curve $k$. However, since wave $W_1$ is delayed in reaching transducer 11, at the time AND gate 30 is inhibited, the bistable circuit 26 is already set and a pulse output is produced at terminal 35. When the monostable circuit 28 is triggered from the wave applied to transducer 11 (curve $k$), the bistable circuit 26 will be reset, and the pulse output of terminal 35 will terminate to produce the pulse wave shown on line $l$ of FIG. 4.

Considering now the action produced by the wave $W_2$, which is from the opposite direction to $W_1$, wave $W_2$ will reach transducer 11 first as shown by curves $m$ and $n$ in FIG. 4. The wave at transducer 11 will produce a pulse wave from differentiator 31 which triggers monostable 28 and inhibits AND gate 30 for the period of the monostable circuit as shown by curve $o$. Accordingly, there will be no output from bistable circuit 26 during this period. The pulse wave from differentiator 31, however, will be applied through AND gate 29 to bistable circuit 25 to produce an output at terminal 32 as the wave has not yet reached transducer 10 to trigger monostable circuit 27 and inhibit AND gate 29. When the wave $W_2$ reaches transducer 10, the pulse from differentiator 22 will trigger monostable circuit 27 to inhibit AND gate 29 and reset bistable circuit 25. The pulse applied to monostable circuit 27 is shown by curve $p$, and the pulse from bistable circuit 25 is shown by curve $q$. In the circuit of FIG. 3 it is the action of the AND gates and the monostable circuits which provide the distinctive response when the wave reaches one transducer before it reaches the other. This provides the same pulse output that is described in connection with FIGS. 1 and 2.

The pulse output at terminal 32 is applied through switch 40 and diode 41 to the integration circuit including resistor 42 and capacitor 43. When switch 40 is closed, the negative voltage will build up on capacitor 43, having a value depending on the length of the pulse on terminal 32. The switch 44 is provided to short capacitor 33 so that it is discharged prior to the integrating action.

The output of terminal 35 is similarly applied through switch 45 and diode 46 to the integrating circuit including resistor 47 and capacitor 48. Switch 49 can be closed to discharge capacitor 48. Switches 40, 44 and 45 and 49 can be controlled by a common control 38 with switches 44 and 49 being closed prior to the start of the integration period so that the capacitors are discharged. The switches 44 and 49 are then opened, and switches 40 and 45 are closed, so that pulses from output terminals 32 and 35 are integrated over a period of time providing a negative voltage across the capacitor 43, and a positive voltage across the capacitor 48. These voltages are applied to indicator 50 which will indicate the polarity and relative durations of the pulses produced at terminals 32 and 35. Although voltages of opposite polarities may be applied to the indicator as stated, a differential indicator may be used which responds to the difference between voltages of the same polarity.

As previously stated, if waves are received from opposite directions during the observation period, the pulses at terminals 32 and 35 are the same duration and of opposite polarity, and the indicator 50 will give a zero indication. If there is a wave only in the direction of $W_1$, and no wave in the opposite direction, there will be a pulse output only at terminal 35. In such case, a positive voltage will be developed across capacitor 48, but no voltage will be developed across capacitor 43. The indicator 50 will, therefore, show that a signal is received from the direction of wave $W_1$. The indicator 50 will give an opposite indication if a wave is received only in the direction of $W_2$.

FIG. 3 also includes arrows marked $W_3$, $W_4$, $W_5$ and $W_6$ representing waves which are received from directions other than directions along the line between the two transducers 10 and 11. $W_4$ is at right angles to waves $W_1$ and $W_2$ and will have no components in either the direction of wave $W_1$ or wave $W_2$ so that no outputs will be produced on indicator 50. The waves $W_3$ and $W_6$ will have components in the direction of wave $W_1$ to produce an output at terminal 35. Wave $W_5$ will have a component in the direction of $W_2$ to produce an output at terminal 32. It will be apparent that with respect to waves coming at an angle to a line between the transducers, the differences in the time that a wave reaches the transducers 10 and 11 will be less than the difference in times for a wave along this line. This will produce pulses of shorter duration. The duration of the pulses will be represented by the voltage across the integrating circuits during a fixed time interval so that these voltages will give an indication of the direction of the pulses.

Waves $W_3$ and $W_6$ of FIG. 3 have the same components in the direction of $W_1$ so that the system as described will not distinguish between the direction of these waves. To provide a system that will give an unambiguous indication of the direction of the waves in a plane, two systems, as shown in FIG. 3, may be used at right angles to each other. Such a system is shown in FIG. 5. The transducers 10 and 11 in FIG. 5, and the processing circuit coupled thereto, are the same as shown in FIG. 3. Transducer 18 is positioned with respect to transducer 11 so that the line therebetween is at a right angle to the line between transducers 10 and 11. In FIG. 5 the components forming a processing circuit connected to transducers 10 and 11 are given the same numbers as in FIG. 3. The components of the processing circuit connected to the transducers 18 and 11 are given corresponding numbers followed by an $a$. The gates 36 and 37 as well as the gates 36$a$ and 37$a$ are operated by the gate control 54. These gates may be switches which apply the signals to the integrators 39, 51, 39$a$ and 51$a$ for the integrating period $\Delta t$. The gate control 54 is also coupled to the integrators to discharge the capacitors thereof to prepare the integrators for the integration period. Gate control 54 is operated by clock signals from gate 95 in FIG. 7 as will be described in a subsequent portion of the specification. Integrators 39, 39$a$, 51 and 51$a$ may consist of a resistor capacitor circuit as shown in FIG. 3, components 42 and 43.

Considering a wave W at an angle with respect to transducers 10 and 11 and also at an angle with respect to transducers 11 and 18 as shown in FIG. 5 the differential combiner 53, responsive to transducers 10 and 11 will produce an output proportional to the cosine of the angle $\theta$ of the wave with respect to the line between transducers 11 and 18. This output is designated as Y. The differential combiner 52, responsive to the waves from transducers 11 and 18, will produce an output, designated as X, proportional to the sine of the angle $\theta$. These two outputs will completely define the direction of wave W in a plane in an unambiguous manner. Thus the X and Y signals are bearing signals and can be displayed to indicate the bearing of the object.

It will be obvious that in the system of FIG. 5, components of random waves parallel to the direction of the line between transducers 10 and 11 will be balanced out in differential combiner 52, and the right angle components parallel to the line between transducers 11 and 18 will be balanced out in the differential combiner 53. Accordingly, random signals will be balanced out and the output signals X and Y from differential combiners 52 and 53 will be only for signals of the given directions which are present for a sufficient time that the integration circuits will provide unbalanced voltages.

Referring to FIG. 6 there is shown a block diagram of a system, incorporating the features of this invention, which can be used to determine a range to an object. A transmitter 56 transmits a wave pulse by means of transducer 55. The wave pulse upon striking the object is reflected and the reflected pulses are received by transducers 59, which are the same as transducers 10, 11 and 18. The received wave pulses are processed by signal processor 58 in the manner previously described to develop the X and Y signals. The X and Y signals are coupled to a range processor 57 where they are further processed to determine the range to the object. Since the range to the object is a function of the time between the transmission of the wave pulse by transducer 55 and the reception of the reflected wave pulse by transducers 59, a signal is cou- pled from transmitter 56 to range processor 57 for measuring this time interval.

In FIG. 7 there is shown a block diagram of the range processor 57 of FIG. 6. In FIG. 7 the X and Y signals from differential combiners 52 and 53 of FIG. 5 are coupled to shift register 62 of walking window integrator 60. The operation of walking window integrator 60 is as follows. The received X and Y signals from differential combiners 52 and 53 are inserted in separate registers of the shift register 62 where they are stepped along by clock pulses from clock 73. The X and Y signals are the magnitudes of the signals stored in integrators 39, 39$a$, 51 and 51$a$, prior to the discharge of the integrating capacitors, as combined by differential combiners 52 and 53. As each pulse enters the shift register it is added to the number stored in the storage units 64 and 68 by means of adders 63 and 67 respectively. The last number in the shift register 62 is coupled to substractors 65 and 69 in storage units 64 and 68 respectively to subtract that number from that number stored in the storage units 64 and 68. Thus the numbers stored in storage units 64 and 68 are changed as each new number is inserted in the shift register and the numbers stored reflect the sum of the numbers in the shift register.

Since the signal processing of this system takes place over discrete time intervals, time can only be measured in discrete time intervals and, therefore, a range error can exist as the time for a pulse to reach an object and return may not be commensurate with the integrating periods. In order to achieve maximum range as much energy should be transmitted as possible. This can be achieved by increasing the period of the transmitted pulse. In order to achieve the maximum range and highest bearing accuracy, the returning pulse should be integrated over the entire pulse time period. However, the longer the integration period $\Delta t$ the less the range resolution so that for good range resolution it is desirable to integrate over a short time period. Therefore, in order to increase the range resolution, integration in the signal processing unit may take place over one or more short integrating periods. By integrating a second time in the walking window integrator 60 over these short integrating periods, the range resolution is unchanged but the energy recovery is vastly increased. Thus by the second integration in walking window integrator 60 maximum energy recovery and bearing accuracy is maintained without loss of range resolution. The shift registers of the walking window integrator have $q$ stages where $q \cdot \Delta t = T_p$ and $T_p$ is the length of the transmitted pulse.

Clock signals from clock 73 transfer the numbers stored in units 64 and 68 respectively to storage units 71 and 72 respectively. The X and Y signals which had been integrated a second time are designed by $\overline{X}$ and $\overline{Y}$. While a second integration is used the quantities $\overline{X}$ and $\overline{Y}$ contain the same type of bearing information as the X and Y signals. Thus the bearing signals X and Y could be used directly to determine range by this system without further integration.

In describing the operation of this system the time period of interest is $k$, the integrating time period at which the reflected wave reaches transducer 59. However, as will become apparent later in the description of the operation of this system, it is also necessary to rceive the following pulse, that is, $k+1$ in order to determine that $k$ is the desired integrating period during which the echo pulse is received.

The output of storage units 71 and 72 are coupled to squaring circuits 75 and 76 respectively to develop the signals $\overline{X}^2$ and $\overline{Y}^2$. These are added in adder 77 to produce the signal $\overline{X}^2 + \overline{Y}^2 = \overline{Z}^2$. $\overline{Z}^2$ (or $Z^2$ if only one integrator is used) is a measure of the confidence that the signal is coming from the direction $\theta$ (FIG. 5), and is designated as the merit signal. In FIG. 7 the number in adder 77 is shown as $\overline{Z}^2_{k+1}$ and this is transferred to shift register 78.

The other numbers stored in shift register 78 are $\bar{Z}^2_k$ and $\bar{Z}^2_{k-1}$ which were obtained during prior integrating periods.

In order to determine the time interval of interest, that is, time interval $k$, the following requirements must be met. $\bar{Z}^2_k$ must be greater than a threshold signal which is arbitrarily determined and designated as $L_{TH}$. $\bar{Z}^2_k$ must also be a local maximum, that is, $|\bar{Z}^2_{k-1}| < |\bar{Z}^2_k| > |\bar{Z}^2_{k+1}|$.

$\bar{Z}^2_k$ is compared with $\bar{Z}^2_{k+1}$ comparing circuit 80. With $|\bar{Z}^2_k| > |\bar{Z}^2_k|$ an output signal from comparing circuit 80 is coupled to gate 82. $\bar{Z}^2_k$ is compared with $\bar{Z}^2_{k+1}$ in comparator 81 and if $|\bar{Z}^2_k| > |\bar{Z}^2_{k-1}|$ an output signal from comparator 81 is transferred to gate 82. With both signals present at gate 82, $\bar{Z}^2_k$ is a local maximum and an output signal is transferred from gate 82 to gate 86.

The local maximum determines the maximum correlation produced by a "second" integration of $q$, X and Y values obtained in the integrating periods T, defining a bearing angle $\theta$. The local maximum $\bar{Z}^2_k$ occurs because all $q$ "second" integration intervals, from $k$ to $k-q+1$ contain X and Y values defining the bearing angle $\theta$. The integrating periods $t$ from 0 to $k-q$ and $k+1$ and beyond contain only random noise signals and thus the result of the "second" integration of these periods will approach 0. When intervals $t$ from $k$ to $k-q+1$ are included in the "second" integration the return echo will be integrated and the result of the "second" integration will depart from 0. The result of the "second" integration will be a local maximum when the $q$ periods $t$ from $k$ to $k-q+1$ are all included in the "second" integration.

Threshold signal generator 84 introduces an $L_{TH}$ signal to comparator 85 where it is compared with $\bar{Z}^2_k$. The threshold signal $L_{TH}$ is arbitrarily chosen and its magnitude is adjustable. This system is operable in environments where the desired signal is many db below noise level. The requirement that $\bar{Z}^2_k$ be greater than $L_{TH}$, local maximums caused by "noise" will not give false ranges. Where the system operates in an environment where the signal-to-noise ratio is high, the comparison of $\bar{Z}^2_k$ with $L_{TH}$ is not necessary. If $\bar{Z}^2_k$ is greater than $L_{TH}$ an output signal from comparator 85 is transferred to gate 86. If the local maximum signal is also present at gate 86 a range signal is generated which is coupled to gates 92, 99 and 100 to enable these gates. With gates 92, 99 and 100 enabled, signals are transferred to indicator 110 in a manner which will be subsequently described.

After determination that the time interval $k$ is the correct time interval it is necessary to display this information so that the range can be determined. Clock signals from clock 73 are coupled to range counter 90 through gate 95. Gate 95 is enabled by a start signal from transmitter 56 and remains enabled to transfer clock signals to range counter 90. The start signal from transmitter 56 is also coupled to range counter 90 to reset the range counter at the beginning of the wave pulse transmission. Range counter 90 counts the time intervals to determine the value of the time interval $k$, that is, the interval during which the echo is received.

Since it is necessary to go one interval beyond time interval $k$, that is, to $k+1$, in order to determine that time interval $k$ is the correct time interval, a delay 91 is inserted between range counter 90 and gate 92. Thus, when the time interval of output range counter 90 is $k+1$ the time interval appearing at gate 92 is $k$. Delay elements 97 and 98 are also inserted between storage units 71 and gate 99 and storage units 72 and gate 100. Thus the input to gate 99 is $\bar{Y}_k$ and the input to gate 100 is $\bar{X}_k$. Gates 92, 99 and 100 are enabled by the range signal from gate 86 which indicates that the information at that particular time represents the range to the target and should be displayed. The output of gate 92 is coupled through digital to analog converter 93 and range gain signal generator 94. Range gain signal generator 94 develops a gain control signal which is coupled to range amplifiers 106 and 107.

The output of gate 99 is coupled to normalizing amplifier 104 through digital to analog converter 101. The output of gate 100 is coupled to normalizing amplifier 105 through digital to analog converter 102. $\bar{Z}^2_k$ stored in shift register 78 is also coupled to normalizer gain signal generator 88 to produce a normalizing gain control signal proportional to the value of $\bar{Z}^2_k$. The normalizing gain control signal from signal generator 88 changes the gain of normalizing amplifiers 104 and 105 so that the $\bar{X}$ and $\bar{Y}$ signals from these amplifiers are normalized. The normalized signals from normalizing amplifiers 104 and 105 are coupled to range amplifiers 106 and 107 respectively. Here the gain control signal from range gain signal generator 94 regulates the gain of the gain amplifiers 106 and 107 to produce output signals, the magnitudes of which are proportional to the range to the object. These signals, designated as $S_Y$ and $S_X$, are coupled to indicator 110 which may be a cathode ray tube. Signals $S_X$ and $S_Y$ can be coupled directly to deflecting plates of a cathode ray tube to position the electron beam a particular distance from the center of the cathode ray tube to indicate the range in this manner. The bearing is also indicated since the signals $\bar{X}$ and $\bar{Y}$ contain bearing information. By Z axis modulation of the cathode ray tube a dot can be positioned on the screen at the proper bearing and distance from the center to indicate the bearing and range of a target.

I claim:

1. A system for measuring the range to an object, including in combination, means for periodically transmitting waves, means for receiving said waves reflected from the object, said receiving means being responsive to said reflected waves to develop a plurality of first and second bearing signals with said bearing signals being a function of the bearing of the object, signal processing means coupled to said receiving means for combining said plurality of first and second bearing signals to develop a plurality of merit signals, threshold signal generating means, comparing means coupled to said signal processing means and said threshold signal generating means for selecting a particular one of said merit signals, said particular merit signal being greater than said threshold signal and further being greater than both the merit signal preceding and the merit signal following said particular merit signal, and timing means coupled to said transmitting means and said comparing means for measuring the time interval between said transmitted wave pulses and said particular merit signal.

2. The range measuring system of claim 1 wherein, said combining means includes means for squaring said plurality of first and second bearing signals and adding said squared first and second bearing signals to develop said plurality of merit signals.

3. The range measuring system of claim 2 wherein said comparing means includes means for storing said particular merit signal and said preceding and following merit signals, said comparing means acting to compare separately said particular merit signal with said preceding merit signal, said particular merit signal with said following merit signal and said particular merit signal with said threshold signal, said comparing means further acting to develop a control signal with said particular merit signal greater than said threshold signal and said preceding and following merit signals, said timing means being responsive to said control signal to measure the time interval between said transmitted wave pulse and said particular merit signal.

4. The range measuring system of claim 3 wherein said comparing means further includes a first comparing circuit coupled to said storing means and responsive to said particular merit signal greater than said preceding merit signal to develop a first gating signal, a second comparing circuit coupled to said storing means and responsive to said particular merit signal greater than said following merit signal to develop a second gating signal, a third comparing circuit coupled to said storing means and said threshold signal generation means and responsive to said particular merit signal greater than said threshold signal to develop a third gating signal, and gating means coupled to said first, second and third comparing circuits and responsive to the simultaneous presence of each of said first, second and third gating signals to develop said control signal.

5. A system for measuring the range to an object, including in combination, means for periodically transmitting waves, means for receiving said waves reflected from the object, said receiving means including a plurality of transducers and means to develop pulse signals in response to said reflected waves traveling between pairs of said plurality of transducers, first integrating means coupled to said receiving means for successively integrating said pulses over a plurality of first time periods to develop a plurality of first and second bearing signals, signal processing means coupled to said first integrating means for squaring said plurality of first and second bearing signals and adding said squared first and second bearing signals to develop a plurality of merit signals, threshold signal generating means, comparing means coupled to said signal processing means and said threshold signal generating means and being responsive to said merit signals and said threshold signal to select a particular merit signal greater than said threshold signal and greater than the merit signals preceding and following said particular merit signal, and timing means coupled to said transmitting means and said comparing means for measuring the time interval between said transmitted wave pulses and said particular merit signal.

6. The range measuring system of claim 5 and further including, second integrating means coupling said first integrating means to said signal processing means, said second integrating means acting to integrate said first and second bearing signals over a plurality of second time periods larger than said first time period to develop a plurality of first and second integrated bearing signals, said signal processing means acting to square said plurality of first and second integrated bearing signals and add said squared first and second integrated bearing signals to develop said plurality of merit signals.

7. The range detection system of claim 6 wherein said comparing means includes means for storing said particular merit signal and said preceding and following merit signals, said comparing means acting to compare separately said particular merit signal with said preceding merit signal, said particular merit signal with said following merit signal and said particular merit signal with said threshold signal, said comparing means further acting to develop a control signal with said particular merit signal greater than said threshold signal and said preceding and following merit signals, said timing means being responsive to said control signal to measure the time interval between said transmitted wave pulse and said particular merit signal.

8. The range measuring system of claim 7 wherein said comparing means further includes a first comparing circuit coupled to said storing means and responsive to said particular merit signal greater than said preceding merit signal to develop a first gating signal, a second comparing circuit coupled to said storing means and responsive to said particular merit signal greater than said following merit signal to develop a second gating signal, a third comparing circuit coupled to said storing means and said threshold signal generation means and responsive to said particular merit signal greater than said threshold signal to develop a third gating signal, and gating means coupled to said first, second and third comparing circuits and responsive to the simultaneous presence of each of said first, second and third gating signals to develop said control signal.

9. The range measuring system of claim 5 wherein, said threshold signal generating means is adjustable whereby the amplitude of said threshold signal may be varied.

10. The range measuring system of claim 6 and further including, indicating means coupled to said second integrating means and said timing means, said indicating means being responsive to said first and second integrated bearing signals and said measured time interval to visually display the range and bearing of the object.

11. A system for measuring the range to an object, including in combination, means for periodically transmitting waves, means for receiving said waves reflected from the object, said receiving means being responsive to said reflected waves to develop a plurality of first and second bearing signals with said bearing signals being a function of the bearing of the object, signal processing means coupled to said receiving means for squaring said plurality of first and second bearing signals and adding said squared first and second bearing signals to develop a plurality of merit signals, comparing means coupled to said signal processing means for selecting a particular one of said merit signals, said particular merit signal being greater than both the merit signal preceding and the merit signal following said particular merit signal, and timing means coupled to said transmitting means and said comparing means for measuring the time interval between said transmitted wave pulses and said particular merit signal.

No references cited.

RODNEY D. BENNETT, *Primary Examiner.*

J. P. MORRIS, *Assistant Examiner.*